Figure 3:
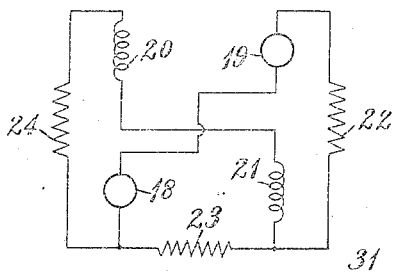

T. VARNEY.
SYSTEM OF ELECTRIC MOTOR CONTROL.
APPLICATION FILED SEPT. 18, 1911.
1,063,400.
Patented June 3, 1913.
2 SHEETS—SHEET 1.
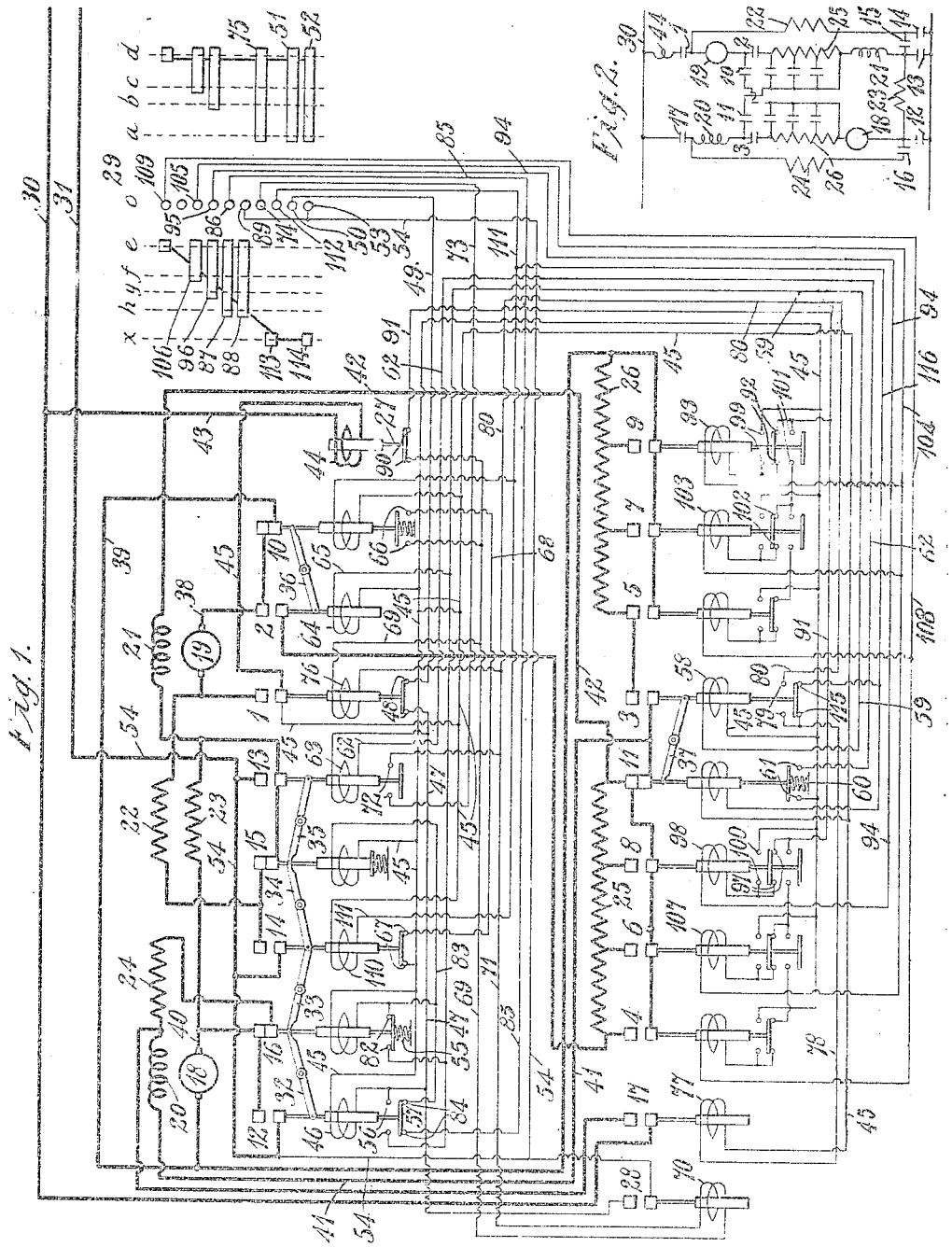

T. VARNEY.
SYSTEM OF ELECTRIC MOTOR CONTROL.
APPLICATION FILED SEPT. 18, 1911.

1,063,400.

Patented June 3, 1913.
2 SHEETS—SHEET 2.

UNITED STATES PATENT OFFICE.

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,063,400.  Specification of Letters Patent.  Patented June 3, 1913.

Application filed September 18, 1911. Serial No. 649,912.

*To all whom it may concern:*

Be it known that I, THEODORE VARNEY, a citizen of the United States, and a resident of Pittsburgh, in the county of Allegheny and State of Pennsylvania, have invented a new and useful Improvement in Systems of Electric-Motor Control, of which the following is a specification.

My invention relates to systems of electric motor control and it has special reference to such systems as are adapted for electric motor-driven hoists and ore bridges.

The object of my invention is to provide a two-motor system of the class above indicated that shall be relatively simple in arrangement and particularly reliable in operation.

Special attention has heretofore been directed to the perfecting of single motor control systems for hoist purposes, but systems of this character are not adapted for use with apparatus having two electric driving motors. Two driving motors are frequently employed, however, with large-capacity hoists and ore bridges, and it is my aim to provide a two-motor system of control that shall be specially adapted to the service for which it is intended.

Figure 1 of the accompanying drawings is a diagrammatic view of a control system arranged in accordance with my invention. Fig. 2 is a simple diagram illustrating the motor circuits and the location of the motor circuit switches. Figs. 3, 4, 5 and 6, respectively illustrate the motor-circuit connections for the off position, the power or hoist positions, the braking positions and the kick-off position.

Referring to Figs. 1 and 2 of the drawings, the system here shown comprises switches 1 to 17, inclusive, electric motors having armatures 18 and 19 and field magnet windings 20 and 21, resistors 22, 23, 24, 25 and 26, relay switches 27 and 28 and a master controller 29. The motors are supplied with energy from any suitable source through circuit conductors 30 and 31. The master controller 29 is adapted to occupy a plurality of power positions $a$, $b$, $c$ and $d$, a plurality of brake positions $e$, $f$, $g$ and $h$, an intermediate off position $o$ and a kick-off position $x$. Each of the switches 1 to 17, inclusive, is provided with an electromagnet, and switches 10, 11, 15 and 16 are normally held closed, being opened by their electro-magnets, while the remaining switches are normally open and are closed by their electro-magnets, when energized. Each of the switches may be provided with a spring to hold it in its normal position, but, as shown in the drawing, all of the switches tend to occupy their open positions by the action of gravity, the switches 10, 11, 15 and 16 being provided with springs which tend to hold them in their closed positions.

The switches 12, 13, 14, 15 and 16 are mechanically interlocked by links 32, 33, 34 and 35 which cause the switch 16 to open when either the switch 12 or the switch 14 is closed and the switch 15 to open when either the switch 13 or the switch 14 is closed. The switches 2 and 10 are similarly locked by a link 36 to prevent both of them from being closed at the same time, and switches 3 and 11 are interlocked by a link 37, in like manner.

Assuming that the switches occupy the positions indicated in Fig. 1 of the drawings, and that the master controller 29 occupies its off position $o$, the motor circuit connections are as illustrated in Fig. 3 of the drawings. In this position, the motor circuit may be traced as follows: From the terminal 38 of armature 19, through switch 10, conductor 39 to one terminal of armature 18, one local circuit being completed through resistor 23, switch 15 and resistor 22, to the opposite terminal of armature 19; another branch being completed from terminal 40 of armature 18, through switch 16, resistor 24, field magnet winding 20, conductor 41, switch 11, conductor 42, field magnet winding 21, switch 15 and resistor 22.

Assuming that the controller is now moved into position $a$, energy is supplied from line conductor 30, through conductor 43, coil 44 of relay switch 27, conductor 45, coil 46 of switch 12, conductor 47, auxiliary contact terminals 48 of switch 1 and conductor 49 to contact-finger 50 of master switch 29. From this point, circuit is completed through contact segments 51 and 52, contact finger 53 and conductor 54 to opposite line conductor 31. When coil 46 is thus energized, switch 12 is closed and switch 16, which is mechanically interlocked therewith, is opened in opposition to a spring 55. Auxiliary contact terminals 56 of switch 12 are bridged by the contact member 57 and another circuit is completed from conductor 45, through coil 58 of switch 3, conductor 59, auxiliary contact terminals 56 of switch 12, conductor 47, etc., as before. Switch 3 is thus closed and switch 11, which is mechanically interlocked therewith, is opened in opposition to a spring 60. When switch 11 is opened, auxiliary contact terminals 61 are bridged, completing a circuit from conductor 45 through contact terminals 61, conductor 62, coil 63 of switch 13, conductor 47, etc., as before. The switch 13 is thus closed and the switch 15, which is mechanically interlocked therewith, is opened. Following the closing of the switch 12, switch 2 is also closed, circuit being completed from conductor 45 to coil 64, conductor 65, contact terminals 56, conductor 47, etc. Switch 10, which is mechanically interlocked with the switch 2, is accordingly opened. Auxiliary contact terminals 66 are bridged when switch 10 is opened and, consequently, current is supplied from conductor 45, through auxiliary contact terminals 67 of switch 14, conductor 68, contact terminals 66, conductor 69, coil 70, of relay switch 28, conductor 71, contact terminals 72 of switch 13, conductor 73 to contact terminals 74 of controller 29, from this point circuit being completed through contact members 75 and 52 as before. Thus, it appears that switches 2, 3, 12 and 13 and relay switch 28 are closed, while switches 10, 11, 15 and 16 are opened.

As soon as relay switch 28 is closed, the control circuits which were completed through conductor 47 and auxiliary contact terminals 48 are completed through the relay switch 28 and conductor 54 to the line conductor 31. They thus become independent of the position of the switch 1 which is now closed, circuit being completed from conductor 45 through contact terminals 67 of switch 14, conductor 68, contact terminals 66 of the switch 10, conductor 69, coil 76, contact terminals 72, conductor 73, etc. Switch 17 is also closed, circuit being completed from conductor 45, through coil 77, conductor 78, contact terminals 79 of switch 3, conductor 80, contact terminal 72, conductor 73, etc.

Figure 4:
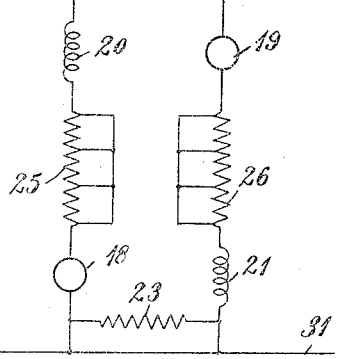

Motor circuit connections are established as shown in Fig. 4 except that the resistors 25 and 26 are not short circuited. From the sequence in which the switches are necessarily closed, it is evident that the motor circuit connections are otherwise complete before it is possible to close the switches 1 and 17 through which energy is supplied.

As controller 29 is successively moved into position $b$, $c$ and $d$, the circuit connections remain the same except that resistors 25 and 26 are gradually short circuited by reason of the action of the relay switch 27, in a well known manner, the switch 8 and 9 being closed in position $b$, the switch 6 and 7 in position $c$ and the switches 4 and 5 in position $d$.

The connection of the motors in parallel for hoisting, as just described and as indicated in Fig. 4, is desirable in order to attain maximum speed with the motors connected directly across the line.

Figure 5:
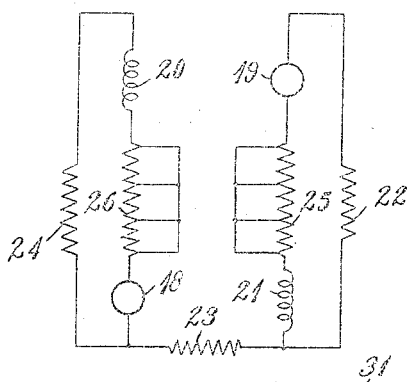

When the controller is moved into position $e$, motor circuit connections are established as shown in Fig. 5 of the drawings by closing switches 2, 3, 4, 5, 6, 7, 8 and 9, and permitting switches 15 and 16 to close and the relay switch 28 and the switch 17 to open. The circuit connections differ from those of Fig. 4 in that the switches 1 and 17, through which energy is supplied from the line conductor 30, are opened and switches 15 and 16, which complete circuit connections for each of the motors, are closed.

As positions $f$, $g$ and $h$ are successively occupied, the sections of the resistors 25 and 26 are gradually inserted. By this means the operator is able to control the braking action and smoothly bring the car or bucket to rest.

The motors are connected in parallel in a local circuit for braking purposes, as shown in Fig. 5, in order to employ the same resistance as in hoisting and to preclude the operation of one machine as a motor and the motor as a generator.

Figure 6:
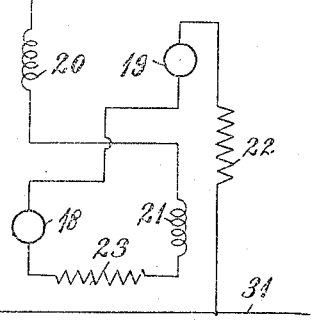

When it is necessary to drive the load downward, the controller is moved to position $x$, which is commonly known as the "kick-off" position, in which circuit connections are established, as shown in Fig. 6 of the drawings, by closing switches 10, 11, 14 and 17. The line current is now supplied through the two motor fields in series, then through the resistor 23, the motor armatures in series and resistor 22 to the opposite side of the circuit. It is evident that the circuit connections are so arranged in every case that the currents traverse the field magnet windings in the same direction whether the motors are hoisting the load, are driving the load downward or are regenerating braking current. This arrangement has the advantage of avoiding the losses and delays in reversing the polarity of the field magnet poles and renders them always capable of building up rapidly for regenerating the braking current.

In the "kick-off" operation, it is not necessary to attain full speed but it is necessary, or at least desirable, to have full-load torque. The series arrangement shown in Fig. 6 permits both motors to develop full-load torque and insures an economical use of power.

The circuit connections which effect the closing of the switches 2 to 9, inclusive, when the controller occupies position *e*, may be traced as follows: from line conductor 30, through the coil 44 of relay switch 27, conductor 45, coil 62 of switch 2, conductor 65, contact terminals 82 of switch 16, conductor 83, contact terminals 84 of switch 12, conductor 85, contact finger 86 of controller 29, contact segments 87 and 88, contact finger 89, and conductor 54 to opposite line conductor 31. Another circuit is completed from conductor 45, through coil 58 of switch 3, conductor 59, contact terminals 82, conductor 83, etc., as before. Since neither of the switches 1 and 17 is closed, no energy is supplied to the line and, consequently, the current traversing the coil 44 of the series relay switch 27 is very small. The switch 27 is, therefore, closed and, since the switches 2 and 3 are both closed by the energizing of the coils 64 and 58, the switches 10 and 11 which are interlocked therewith, are both opened. A control circuit is, therefore, established from conductor 45, through contact terminals 67 of switch 14, which is opened, conductor 68, contact terminals 66 of switch 10, contact terminals 90, conductor 91, contact terminals 92 of switch 9, coil 93, conductor 94, finger 95 of controller 29 and contact segments 96 and 88 to finger 89, from which point circuit is completed as before.

Another control circuit is completed from conductor 91, through contact terminals 97 of switch 8, coil 98 and conductor 94 as before. Immediately following the closure of switches 8 and 9, holding circuits are completed from conductor 45, through contact terminals 99 and 100, coils 63 and 98 and conductor 94, as before. Control circuits are completed from conductor 91, through contact terminals 101 of switch 9, contact terminals 102 of switch 7, coil 103, conductor 104, contact finger 105 and segments 106 and 88, circuit being completed as before. A corresponding control circuit is completed through coil 107, of switch 6, and, following the closure of switches 6 and 7, switches 4 and 5 are similarly closed, control circuits first being completed through conductor 108 and contact finger 109. As the controller 29 successively occupies positions *f*, *g* and *h*, contact fingers 109, 105 and 95 are successively disengaged from the corresponding contact segments of the controller 29 and, consequently, the switches 4 and 5 are first permitted to open, the switches 6 and 7 at the next step and the switches 8 and 9 being finally opened to gradually insert the resistors 25 and 26. This is in accordance with the usual practice for braking controllers.

When the controller occupies position *x*, the circuit connections shown in Fig. 6 are established by closing switches 14 and 17, which is effected as follows: Circuit connections are established from line conductor 30, through conductor 43, coil 44 of relay switch 27, conductor 45, coil 110 of switch 14, conductor 111, finger 112, segments 113 and 114, finger 53 and conductor 54 to opposite line conductor 31. Circuit is also established from conductor 45, through coil 77 of switch 17, conductor 78, contact terminals 115 of switch 3, which is open, conductor 116 to conductor 111, circuit being completed as before. Switches 14 and 17 are thus closed and switches 15 and 16 which are interlocked with the switches 14, are both opened and, consequently, the desired motor circuit connections are established.

It is evident that modifications in circuit connections may be effected within the spirit and scope of my invention.

I claim as my invention:

1. In a control system, the combination with a supply circuit, two motors, and resistors, of means for connecting the motors in independent circuits for operation in one direction, in a single circuit for operation in the opposite direction and in independent local circuits for braking.

2. A hoist control system comprising a supply circuit, a pair of electric motors, resistors, and means for connecting the motors to the supply circuit in multiple relation for hoisting, in series relation for kick-off and in two local circuits for braking.

3. A hoist control system comprising a supply circuit, a pair of electric motors, resistors, and means for connecting the motors to the supply circuit in multiple relation for hoisting, in series relation, with their armature circuits reversed, for kick-off and in two independent local circuits for braking.

4. A hoist control system comprising a supply circuit, a pair of electric motors, resistors, and means for connecting the motors in series relation in a local circuit when they are at rest, for connecting the motors to the supply circuit in multiple relation for hoisting, in series relation for kick-off and in independent local circuits for braking.

5. A hoist control system comprising a supply circuit, a pair of electric motors, resistors, and means for connecting the motors in series relation in a local circuit when they are at rest, for connecting the motors to the supply circuit in multiple relation for hoisting and in independent local circuits for braking.

6. A hoist control system comprising a supply circuit, a pair of electric motors, resistors, and means for connecting the motors in series relation in a local circuit when they are at rest, for connecting the motors to the supply circuit in multiple relation for hoisting and in series relation for kick-off.

In testimony whereof, I have hereunto subscribed my name this 12th day of Sept., 1911.

THEODORE VARNEY.

Witnesses:
D. H. MACE,
B. B. HINES.